UNITED STATES PATENT OFFICE.

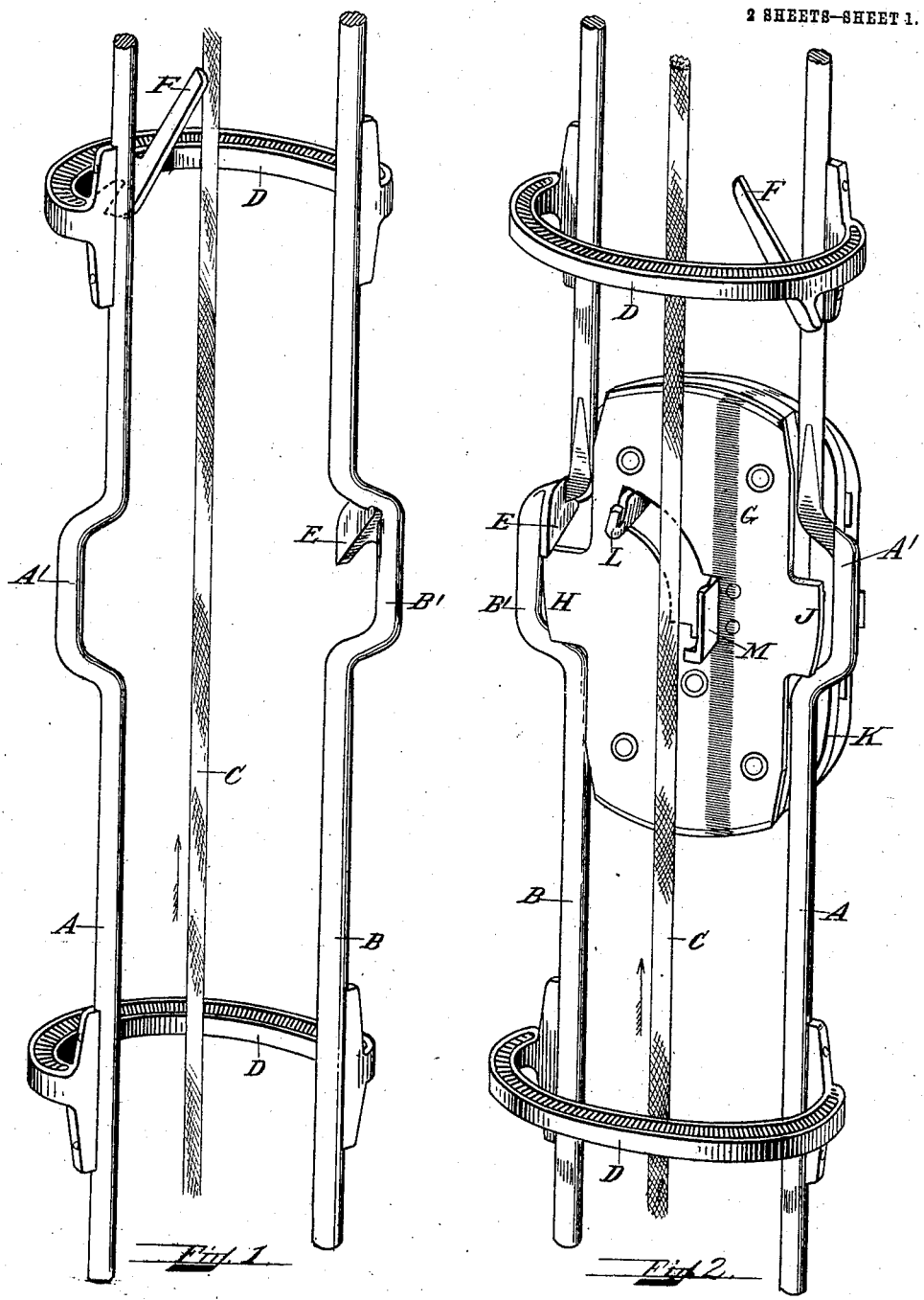

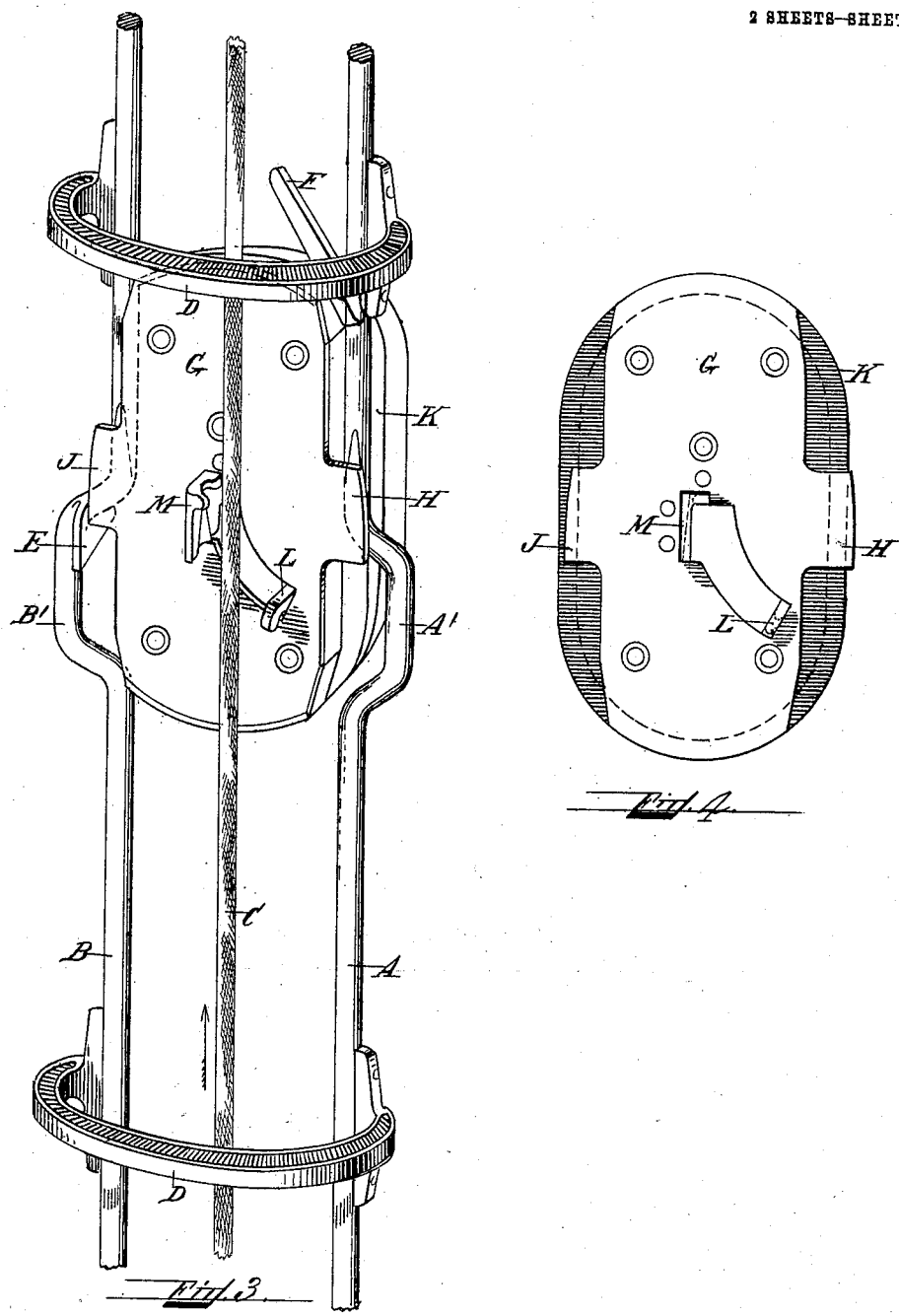

GEORGE A. AMSDEN, OF LITTLETON, MASSACHUSETTS, ASSIGNOR TO LAMSON CONSOLIDATED STORE SERVICE COMPANY, OF NEWARK, NEW JERSEY, A CORPORATION OF NEW JERSEY.

CABLE-CARRIER APPARATUS.

978,826.  Specification of Letters Patent.  Patented Dec. 20, 1910.

Application filed February 13, 1908, Serial No. 415,698. Renewed May 16, 1910. Serial No. 561,720.

*To all whom it may concern:*

Be it known that I, GEORGE A. AMSDEN, of Littleton, in the county of Middlesex and State of Massachusetts, have invented certain new and useful Improvements in Cable-Carrier Apparatus, of which the following is a specification.

My invention relates to improvements in cable carrier apparatus and its object is to prevent the insertion or despatching of a carrier wrong end foremost. This device also operates to eject the carrier from coöperation with the tracks if the carrier should be inserted in the wrong position thereby avoiding collision with other carriers and consequent blocking of the line.

In the accompanying drawings is illustrated a construction embodying my invention in which,—

Figure 1 is a front perspective view of a portion of a cable carrier apparatus showing the device for controlling the despatching of carriers. Fig. 2 is a rear perspective view showing the device operating to prevent the despatching of a carrier wrong end foremost. Fig. 3 is a similar view to Fig. 2 and shows a carrier inserted in the proper position for despatch. Fig. 4 is a bottom plan view of a carrier.

Like letters of reference refer to like parts throughout the several views.

A and B represent the two opposite tracks or rails of a cable carrier apparatus upon which the carriers travel and which tracks are supported and held in alinement by brackets D.

C is a cable for actuating or driving the carriers and A' and B' are bends or spreads in the tracks A and B respectively and permit the insertion of carriers into coöperation with the tracks and cable for despatch.

F is a cam secured to one of the brackets D and is adapted to engage the movable member L of the clamp M on the bottom of a carrier whenever a carrier is inserted in the proper position into coöperation with the tracks and moved forward. The closing of the clamp member L grips the cable C causing the carrier to be transmitted to its destination.

K is a fiber plate and G is a metal plate secured to the bottom of the carrier (see Fig. 4).

H and J are lips or extensions on the plate G and are adapted to be inserted into the bends or spreads A' and B' respectively to place the carrier into coöperation with the tracks.

E is a beveled member mounted in and secured to the bend or spread B' in track B.

It will be noticed that the lip H projects outward beyond the plate G more than the lip J, therefore when a carrier is inserted wrong end foremost as shown in Fig. 2, the lip H is engaged by the member E and as the operator pushes the carrier forward to connect the same with the cable, the lip H rises on the inclined surface of the cam plate ejecting the carrier. If the carrier is inserted for despatch in the proper position (see Fig. 3), the lip J being shorter than lip H, the said lip J is not engaged by the cam plate E and the carrier can be pushed forward by the operator until the member L is closed by the cam F gripping the cable C which transmits the carrier to its destination.

Having thus described my invention and set forth a construction embodying the same, what I claim as new and desire to secure by Letters Patent of the United States is,—

1. In a cable carrier apparatus, a track or way, a cable adapted to actuate carriers along said track or way, despatching stations for placing carriers into coöperation with said track and cable, means for ejecting carriers from said stations when inserted for despatch wrong end foremost, and means for causing the engagement of the carriers and cable when the carriers are inserted for despatch right end foremost.

2. In a cable carrier apparatus, a track or way, a cable adapted to actuate carriers along said track or way, despatching stations permitting the insertion of carriers into coöperation with said track and cable, an ejecting device located at each of said despatching stations, and a lip or projection located on said carriers and adapted to engage said device when a carrier is inserted wrong end foremost to prevent the despatching of and eject said carrier.

3. In a cable carrier apparatus, a track or way, a cable adapted to actuate carriers along said track or way, despatching stations for placing carriers into coöperation with said track or way and cable, a plate secured to each carrier and provided with projecting lugs of different widths, and means located in the path of the carriers and adapted when engaged by the lug of greater width to prevent the engagement of the carriers and cable.

4. In a cable carrier apparatus, a track or way, a cable adapted to actuate carriers along said track or way, despatching stations for placing carriers into coöperation with said track or way and cable, a plate secured to the bottom of each carrier and provided with projecting lugs of different widths, and means located in the path of the carriers and adapted when engaged by the lug of greater width to prevent the engagement of the carriers and cable.

5. In a cable carrier apparatus, a track or way, a propelling cable for driving carriers along said track, gripping mechanism on the carriers for gripping the cable to propel the carriers, means for operating said gripping mechanism to grip the cable, and means for preventing the engagement of said gripping mechanism and said operating mechanism when the carrier is placed on the track for despatch wrong end foremost.

6. In a cable carrier apparatus, a track or way, a propelling cable for driving carriers along said track, gripping mechanism on the carriers for gripping the cable to propel the carriers and normally open, means for operating said gripping mechanism to grip the cable, and means for preventing the engagement of said gripping mechanism and said operating mechanism when the carrier is placed on the track for despatch wrong end foremost.

7. In a cable carrier apparatus, a track or way, a propelling cable, despatching stations for placing the carriers on the track for despatch, gripping mechanism on the carriers for gripping the cable to propel the carriers, means located at each despatching station for operating said gripping mechanism to grip the cable, and means located at each despatching station for preventing the engagement of said gripping mechanism and said operating mechanism when the carrier is placed on the track for despatch wrong end foremost.

8. In a cable carrier apparatus, a track or way, a propelling cable, despatching stations for placing the carriers on the track for despatch, gripping mechanism on the carriers for gripping the cable to propel the carriers, a cam for operating said gripping mechanism to grip the cable, and means for preventing the engagement of said gripping mechanism and cam when the carrier is placed on the track for despatch wrong end foremost.

9. In a cable carrier apparatus, a track or way, a propelling cable, despatching stations for placing the carriers on the track for despatch, gripping mechanism on the carriers and normally open for gripping the cable to propel the carriers, means located at each despatching station for operating said gripping mechanism to grip the cable, and means located at each despatching station for preventing the engagement of said gripping mechanism and said operating mechanism when the carrier is placed on the track for despatch wrong end foremost.

10. In a cable carrier apparatus, a track or way, a propelling cable, despatching stations for placing carriers on the track for despatch, gripping mechanism on the carriers for gripping the cable to propel the carriers, means for operating said gripping mechanism to grip the cable, means projecting from the sides of the carrier and of different widths to hold the carriers on the track during propulsion, and means located in the path of the carriers and adapted when engaged by the projecting means of greater width to prevent the engagement of said gripping mechanism and said operating mechanism.

11. In a cable carrier apparatus, a track or way, a propelling cable, despatching stations for placing carriers on the track for despatch, gripping mechanism on the carriers for gripping the cable to propel the carriers, means for operating said gripping mechanism to grip the cable, means projecting from the sides of the carrier and of different areas to hold the carriers on the track during propulsion, and means located in the path of the carriers and adapted when engaged by the projecting means of greater area to prevent the engagement of said gripping mechanism and said operating mechanism.

In testimony whereof, I have signed my name to this specification in the presence of two subscribing witnesses, this eighth day of February A. D. 1908.

GEORGE A. AMSDEN.

Witnesses:
A. L. Morse,
L. G. Bartlett.